United States Patent [19]
Nelson et al.

[11] Patent Number: 5,333,220
[45] Date of Patent: Jul. 26, 1994

[54] QUANTUM NON-DEMOLITION OPTICAL TAPPING

[75] Inventors: Brian P. Nelson; Keith J. Blow, both of Woodbridge; Nicholas J. Doran, Stratford-Upon-Avon, all of England

[73] Assignee: British Telecommunications Public Limited Company, London, England

[21] Appl. No.: 842,340

[22] PCT Filed: Sep. 13, 1990

[86] PCT No.: PCT/GB90/01417
§ 371 Date: Mar. 25, 1992
§ 102(e) Date: Mar. 25, 1992

[87] PCT Pub. No.: WO91/04509
PCT Pub. Date: Apr. 4, 1991

[30] Foreign Application Priority Data
Sep. 15, 1989 [GB] United Kingdom ............ 8920912

[51] Int. Cl.⁵ .................................... G02B 6/26
[52] U.S. Cl. ........................... 385/48; 385/43; 385/45
[58] Field of Search .................... 385/48, 45, 43

[56] References Cited
FOREIGN PATENT DOCUMENTS
0265233 4/1988 European Pat. Off. ....... G02F 1/35

OTHER PUBLICATIONS

Electronics Letters, vol. 24, No. 6, Mar. 1988, (Stevenage, Herts, GB), I. H. White et al: "Demonstration of the optical kerr effect in an all–fibre mach–zehnder interferometer at laser diode powers", pp. 340–341.
Electronics Letters, vol. 24, No. 21, 13 Oct. 1988, (Stevenage, Herts, GB), R. V. Penty et al: "Nonlinear, two-moded, single-fibre, interferometric switch", pp. 1338–1339.
Optics Letters, vol. 14, No. 15, 1 Aug. 1989, Optical Society of America, (New York, US), M. N. Islam et al: "Soliton switching in a fiber nonlinear loop mirror", pp. 811–813.
Optics Communications, vol. 61, No. 2, 15 Jan. 1987, Elsevier Science Publishers B.V. (North-Holland Physics Publishing Division), (Amsterdam, NL), N. Imoto et al: "A nonlinear optical-fiber interferometer for non-demolitional measurement of photon number", pp. 159–163.
Opt. Com., Imoto et al. "A Nonlinear Optical Fiber . . ." vol. 61 #2, Jan. 15, 1987.

Primary Examiner—Frank Gonzalez
Assistant Examiner—Stephen W. Barns
Attorney, Agent, or Firm—Nixon & Vanderhye

[57] ABSTRACT

A single silica optical fiber (4) is formed in a Sagnac interferometer (2) by forming a fused, dichroic optical fiber coupler (8) having four ports (10, 12, 14 and 16). A 1.3 μm optical data signal is coupled to the port (10) via a dichroic optical fiber coupler (18) which combines it with a 1.53 μm c-w probe signal from laser (16). The coupler (8) splits the 1.53 μm probe signal into two equal intensity, counter-propagating portions and couples the 1.3 μm data signal so it propagates in one direction round the loop (6). The loop (6) exhibits a non-linearity such that the data signal provides a relative phase shift of the counter-propagating c-w probe portions causing a portion of the 1.53 μm signal is switched to port (12). This 1.53 μm switched output provides tapping of the data signal without affecting its intensity.

14 Claims, 3 Drawing Sheets

QUANTUM NON-DEMOLITION OPTICAL TAPPING

BACKGROUND OF THE INVENTION

1. Field of the Invention

This invention relates to quantum non-demolition optical tapping of particular, but not exclusive, application to communications systems in which a transmitted data optical signal is to be accessed by many receiving stations.

2. Related Art

A commonly employed method of transmitting data from a transmitter station to many receiver stations is to convert the data into a modulated optical signal and transmit it down an optical fibre. Each receiver station is associated with an optical tap which extracts some of the optical energy in the transmitted signal which it can subsequently convert to an electrical signal for processing by means of an optical detector. The optical tap may be an optical fibre coupler for example.

A disadvantage of such optical taps is that the transmitted optical signal is reduced in intensity by each successive optical tap. This can be avoided by using quantum non-demolition (QND) optical taps, that is, optical taps in which the tapping process does not significantly affect the intensity of the transmitted signal.

An experimental arrangement for the QND determination of the intensity of an optical signal is discussed in N. Imoto et al's article entitled "A non-linear optical fiber interferometer for nondemolition measurement of photon number", Optics Communications Vol 61 No2, Jan. 15, 1987 which employs a ring-type interferometer. In this arrangement a cw signal from a YAG 1.3 μm laser is amplitude modulated to produce a data optical signal which data is to be tapped without reducing its intensity.

The data signal is transmitted through a first wavelength dependent mirror coupled into a silica optical fibre from which it exits to pass through a second wavelength dependent mirror.

A probe signal at 1.52 μm impinges on a 50:50 beam splitter positioned so equal portions are directed to the first and second mirrors. These mirrors are reflective at 1.52 μm and angled to direct the portions into opposite ends of the optical fibre. The two portions propagate round the ring defined by the beamsplitter and the two mirrors in opposite directions. They recombine at the beamsplitter a portion being transmitted and reflected interferingly to an optical detector adjacent the beamsplitter.

The probe signal portion which propagates co-directionally with the data optical signal has its phase modulated relative to the other probe signal by the data optical signal due to the optical Kerr effect. This phase modulation is measured by the non-linear optical detector as the varying interference between the two probe portions. The transmitted data is therefore detected without tapping any of the data signal.

The prior art QND tapping arrangements just described would be difficult to employ in a practical communications systems. There are several optical components which must be kept in accurate alignment if the data signal is not to be unnecessarily attenuated. There are several interfaces in the apparatus which will introduce some losses to the data signal even though no energy is directed to the optical detector.

BRIEF SUMMARY OF THE INVENTION

According to the present invention a quantum non-demolition optical sampler comprises:

a first optical coupler having a first and a second pair of optical communication ports in which substantially equal first signal portions of an optical signal at a first wavelength received at a port of one pair are coupled to the two ports of the other pair of ports;

an optical waveguide coupling together the second pair of ports and including an interaction section which includes a material having a non-linear refractive index;

a cw optical source for providing a cw optical probe signal at the first wavelength optically coupled to a first port of the first pair of ports;

a means for coupling a received optical signal at a second wavelength to the interaction section so the received optical signal propagates along it in substantially one direction;

the magnitude of non-linearity of the non-linear material being sufficient for the received optical signal to provide a relative phase shift in the first signal portions as they propagate round the optical waveguide.

In this specification by "non-linear" we mean that the refractive index of a material varies with the intensity of the transmitted signal. Typically the refractive index n is given by the formula $$n = n_0 + n_2 /E/^2$$

where $n_0$ is the linear refractive index, $n_2$ is the Kerr coefficient and $/E/^2$ the intensity of the transmitted signal.

For a zero intensity received optical signal, the first optical waveguide coupler and the optical waveguide—which form a Sagnac antiresonant interferometer—acts as a loop mirror to the cw probe optical signal in that the signal entering the coupler at a first port will be reflected i.e. it will exit from that same port. This is because the two counter propagating portions maintain the same relative phase. When a received optical signal propagates along the interaction section of the waveguide—so inducing a phase shift in that first portion which co-propagates with it—the condition for reflection is broken and some of the probe optical signal will exit the second port. The received signal is not affected and can be transmitted to the next receiver station for QND tapping there.

Preferably, the first optical coupler is a dichroic optical coupler coupling substantially all of the received optical signal received at one port of one pair to one port of the other pair, the cw optical source also being optically coupled to one of the first pair of ports as this provides in a simple manner both the two counter propagating cw portions at the first wavelength and propagation of the probe signal in a single direction around the optical waveguide.

The received optical source can be coupled to and extracted from the interaction portion by other arrangements, for example by means of a pair of dichroic coupler in the optical waveguide loop.

The waveguides are conveniently formed from optical fibres but any other waveguides exhibiting the necessary non-linear effects may be used, for example, planar waveguides.

BRIEF DESCRIPTION OF THE DRAWINGS

Embodiments of the present invention and its principle of operation will now be described in more detail with reference to the accompanying drawings in which.

DETAILED DESCRIPTION OF EXEMPLARY EMBODIMENTS

Figure 1:
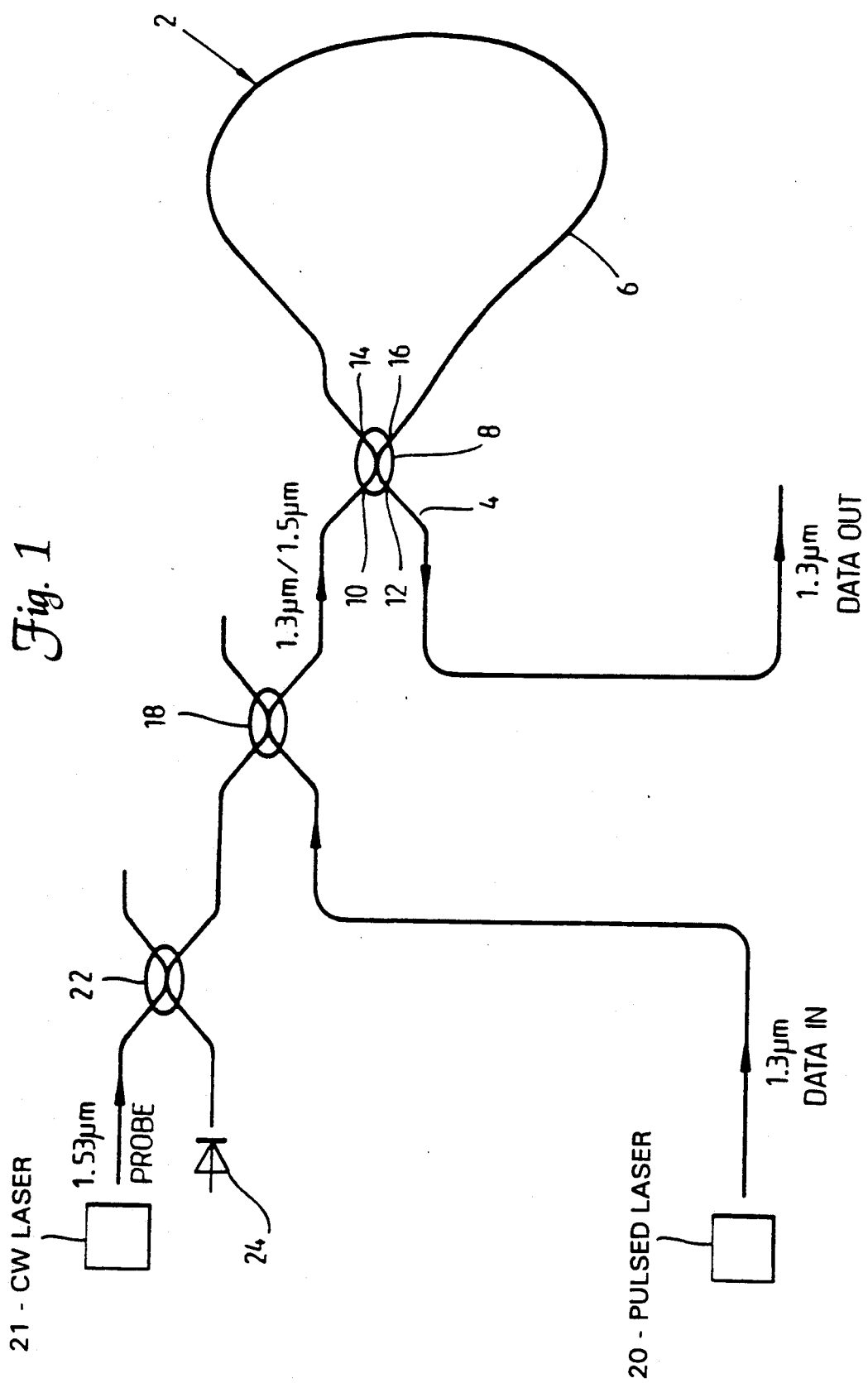
FIG. 1 is a graph of the calculated non-linear phase imposed on the cw optical signal by an optical pulse.

Referring to FIG. 1 a Sagnac antiresonant interferometer 2 is defined by a single silica optical fibre 4 formed into an optical fibre loop 6 with portions of the optical fibre being formed into a fused optical fibre coupler 8 having a first pair of ports 10,12 and a second pair of ports 14, 16. In this embodiment the loop 2 provides an interaction section by providing an optical fibre exhibiting a non-linear refractive index. The fibre loop 6 was 500 m long and polarisation maintaining.

A modelocked Nd:YAG laser 20 provides a pulsed optical signal of 130 ps pulse width at 1.3 $\mu$m which is coupled into the first port 10 by means of a dichroic coupler 18 and representative of a received data pulse.

A continuous wave (cw) F-centre 21 provides a cw optical probe signal at 1.53 $\mu$m which is also coupled to the port 10 of the coupler 8 by means of the optical couplers 18 and 22.

The coupler 8 is manufactured in well known manner so as to couple equal portions of the cw optical probe signal coupled to port 10 to the ports 14 and 16 to produce two counterpropagating equal intensity cw portions in the loop 6 and to couple substantially all of the pulsed optical signal into port 14 (an extinction ratio of 37 dB at 1.3 $\mu$m) so the pulsed signal propagates in only one direction in the loop 6.

The coupler 22 has a 50:50 splitting ratio for 1.53 $\mu$m and is included in this experimental arrangement to provide a monitoring point for the backreflected signal. The coupler 18 is a dichroic coupler in which both the 1.53 $\mu$m and 1.3 $\mu$m optical signals are combined.

The performance of the device was monitored at coupler 22 with a photodiode 24 which had a pulse response of 70 ps FWHM and the output displayed on a sampling oscilloscope (not shown). The signal at this monitor diode is the 1.53 $\mu$m signal along because none of the 1.3 $\mu$m pulsed optical signal returns to this port.

Consider now when a cw optical probe signal at 1.53 $\mu$m and a pulsed optical signal at 1.3 $\mu$m are propagating round the loop 6. Under these conditions the portion of the cw signal co-propagating in the same direction and with the pulsed optical signal can be described by the following pair of coupled equations in normalised units.

$$i\left(\frac{\partial A}{\partial z} + \beta'_A \frac{\partial A}{\partial t}\right) = |A|^2 A + 2|B|^2 A \tag{1a}$$

$$i\left(\frac{\partial B}{\partial z} + \beta'_B \frac{\partial B}{\partial t}\right) = \frac{\omega_B}{\omega_A}(|B|^2 B + 2|A|^2 B) \tag{1b}$$

In equations 1, A is the pulse signal (high power) and B is the cw signal (low power) which is propagating in the same direction as A. The group delay is given by $\beta'_A$ and $\beta'_B$ for the appropriate waves. Since B is small we can neglect terms of order $B^2$. In addition, if we transform into the frame moving with the group velocity of the B wave then equation (1) becomes $$i\left(\frac{\partial A}{\partial z} + \Delta\beta' \frac{\partial A}{\partial t}\right) = 0 \tag{2a}$$

$$i\frac{\partial B}{\partial z} = 2\frac{\omega_B}{\omega_A}|A|^2 B \tag{2b}$$

where $$\Delta\beta' = \beta'_A - \beta'_B \tag{3}$$

is the difference in group delays of the two waves. Note, we have also neglected the SPM of the pulse signal since the nonlinear response is unaffected by this term.

The solution for A is simply a travelling wave given by $$A(z,t) = p_A^{\frac{1}{2}}(t - \Delta\beta' z) \tag{4}$$

The equation for B can now be integrated to give $$B(z,t) = B(0,t) \exp i\left\{\frac{2\omega_B}{\omega_A} \int_0^L P_A(t - \Delta\beta' z) dz\right\} \tag{5}$$

where L is the length of the loop 6. Equation (5) is exact even when SPM is included in the pump. The expression in brackets in equation (5) represents the phase change $\phi$ of the CW B signal caused by the pulse signal $P_a(t)$. The reflected B signal from the loop mirror can be simply expressed in terms of this phase as $$B_{ref} = B(1 + \cos(\phi))B_{in}/2 \tag{6}$$

(see N. J. Doran and D. Wood, "Non-linear Optical Loop Mirror" Optics Lett 13 56–58 (1988).). This expression shows that the low power B signal is modulated by the high power A signal pulse. In addition, the difference in group delay between the two signals leads to a broadening of the reflected pulse because the phase $\phi$ depends upon the integral of the pump pulse $P_A(t)$. As an example, if the A signal is given by $$A(t) = U \operatorname{sech}(t) \tag{7}$$

then the nonlinear phase change is given by $$\phi(t) = U^2 (\tanh(t) - \tanh(t - \Delta\beta' L))/\Delta\beta' \tag{8}$$

Figure 2:
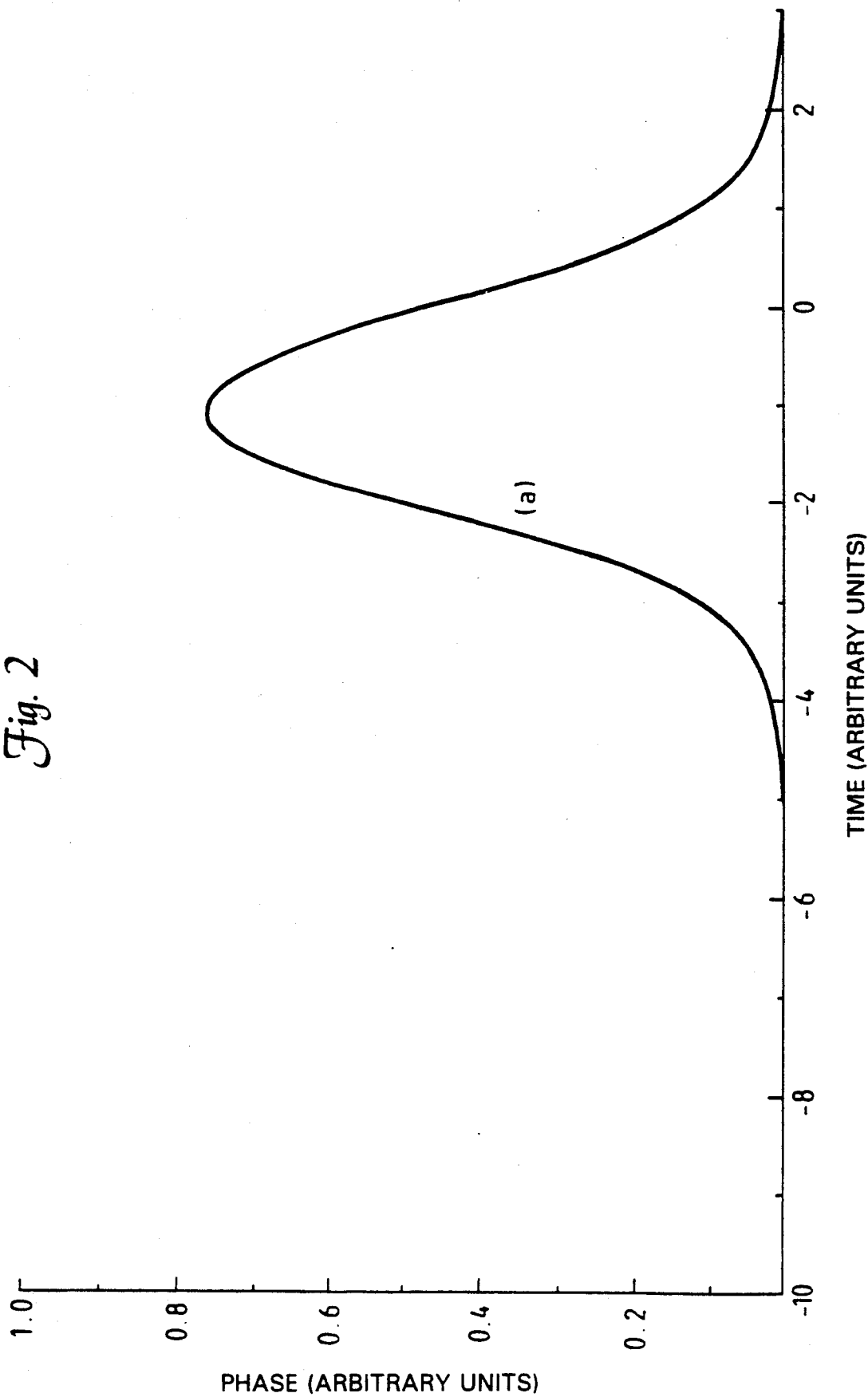
FIG. 2 is a schematic diagram of an NQD optical tap according to the present invention.

Referring to FIG. 2 there is shown the nonlinear phase for a loop length which is small compared to the pulse walk off length $1/(\Delta\beta')$. The non-linear phase charge is converted by the interference of the counterpropgating portions at the coupler to a modulation in the probe signal. This can be detected by monitoring the reflected probe signal by the diode 24. The 1.3 $\mu$m data optical signal exits port 4 of the coupler 8 for onward transmission to the next received station.

Figure 3:
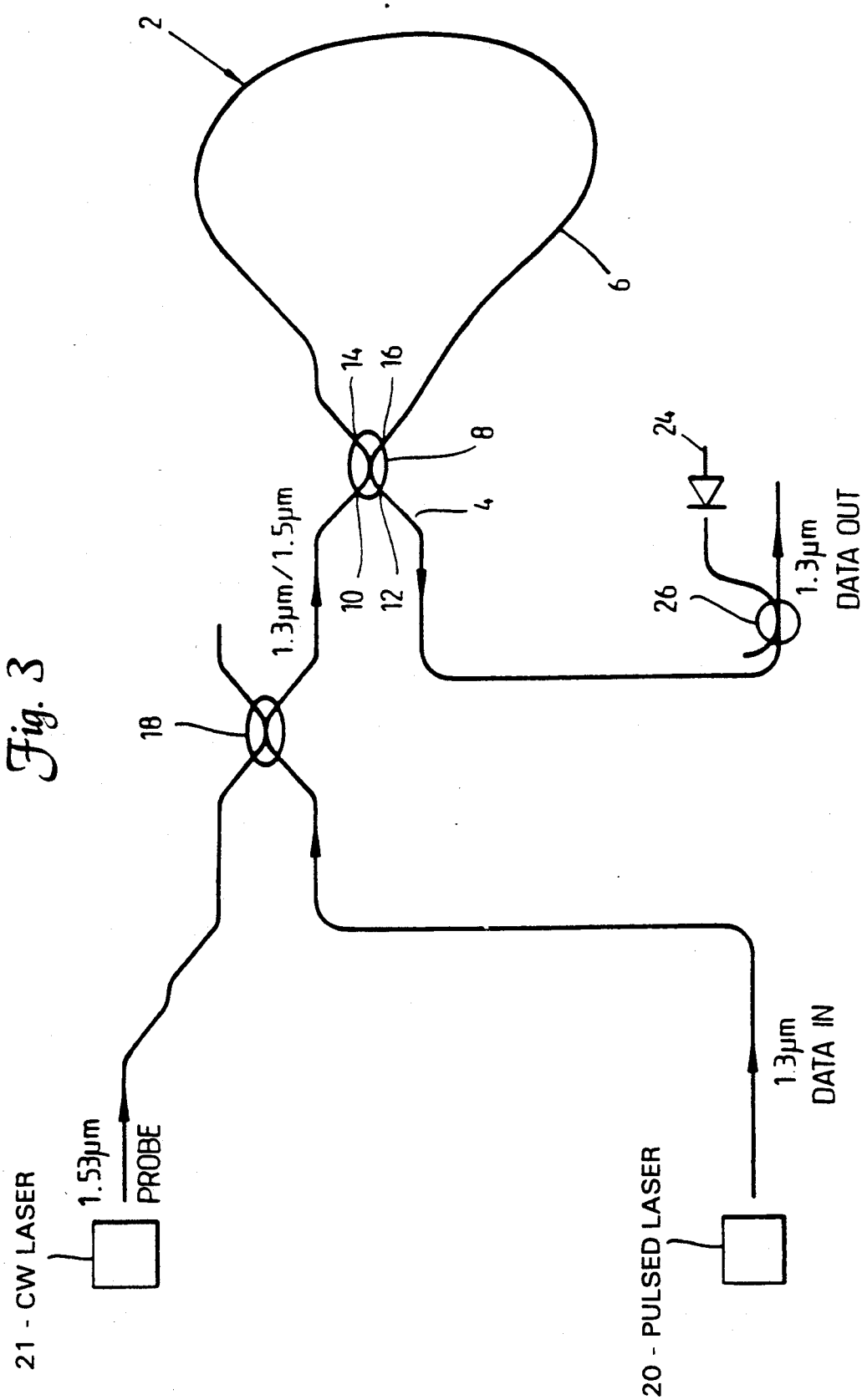
FIG. 3 is a schematic diagram of a second embodiment of the present invention.

Referring now to FIG. 3 an alternative embodiment is shown in which those parts identical with the FIG. 1 embodiment is shown in which those parts identical with the FIG. 1 embodiment are referenced by the same reference numerals.

This differs from the FIG. 1 embodiment in that there is included a dichroic coupler 26 which extracts the 1.53 μm probe signal for detection by the diode 24 whilst the 1.3 μm data signal is untapped and available for onward transmission to the next receiving station.

The dichroic coupler 8 can be arranged to couple all or none of the 1.53 μm probe signal from port 10 to port 14.

It will be clear that other embodiments of the present invention can be employed including using different optical couplers, non-linear materials and operate at different probe and data frequencies without detracting from the generality of the invention as here disclosed.

We claim:

1. A quantum non-demolition optical tap comprising:
   a first optical coupler having a first and a second pair of optical communication ports in which substantially equal first signal portions of an optical signal at a first wavelength received at a port of one pair are coupled to the two ports of the other pair of ports;
   an optical waveguide coupling together the second pair of ports and including an interaction section which includes a material having a non-linear refractive index;
   a continuous wave (cw) optical source for providing a cw optical probe signal at the first wavelength coupled to a first port of the first pair of ports;
   a means for coupling a received optical signal at a second wavelength different from the first wavelength to the interaction section so the received optical signal propagates along it in substantially one direction;
   the magnitude of non-linearity of the non-linear material being sufficient for the received optical signal to provide a relative phase shift in the first signal portions as they propagate round the optical waveguide.

2. An optical tap as in claim 1 in which the optical waveguide comprises an optical fibre.

3. An optical tap as claimed in claim 2 in which the optical fibre (6) comprises a single mode silica-based fibre.

4. An optical tap as in claim 1 in which the first optical coupler comprises a fused, optical fibre coupler.

5. An optical tap as in claim 4 in which the optical waveguide and said first optical coupler are formed from a single optical fibre.

6. An optical tap as claimed in claim 1 in which the first wavelength is about 1.53 μm and the second wavelength is about 1.3 μm.

7. A quantum non-demolition optical tap comprising:
   a first optical coupler having a first and a second pair of optical communication ports in which substantially equal first signal portions of an optical signal at a first wavelength received at a port of one pair are coupled to the two ports of the other pair of ports;
   an optical waveguide coupling together the second pair of ports and including an interaction section which includes a material having a non-linear refractive index;
   a continuous wave (cw) optical source for providing a cw optical probe signal at the first wavelength optically coupled to a first port of the first pair of ports;
   means for coupling a received optical signal at a second wavelength different from the first wavelength to the interaction section so the received optical signal propagates along it in substantially one direction; the said means for coupling including a dichroic coupler for combining the cw probe signal and any received optical signal, the dichroic coupler being coupled to one port of the first pair of optical communications ports;
   the magnitude of non-linearity of the non-linear material being sufficient for the received optical signal to provide a relative phase shift in the first signal portions as they propagate round the optical waveguide.

8. An optical tap as in claim 7 in which the optical waveguide comprises an optical fibre.

9. An optical tap as in claim 7 in which the optical fibre comprises a single mode silica-based fibre.

10. An optical tap as in claim 7 in which the said first optical coupler comprises a fused, optical fibre coupler.

11. An optical tap as in claim 10 in which the optical waveguide and the said first optical coupler are formed from a single optical fibre.

12. An optical tap as in claim 1 in which the first wavelength is about 1.53 μm and the second wavelength is about 1.3 μm.

13. A method of operating a quantum non-demolition tap comprising:
   providing a first optical coupler having a first and a second pair of optical communication ports;
   coupling together the second pair of ports with an optical waveguide including an interaction section which includes a material having a non-linear refractive index; and
   injecting a continuous wave optical signal at a first wavelength to a first port of the pair of ports;
   receiving at one port of said first pair of optical communication ports said continuous wave optical signal at a first wavelength;
   coupling substantially equal first signal portions of said continuous wave optical signal received at said one port to two ports of said second pair of optical communication ports; and
   coupling a received optical signal at a secone wavelength different from said first wavelength to said interaction section and propagating said received optical signal along said interaction section in substantially one direction thereby producing a relative phase shift in said first signal portions as they propagate around said optical waveguide.

14. A method as in claim 13 in which the first wavelength is substantially 1.53 μm and the secone wavelength is substantially 1.3 μm

* * * * *